Feb. 19, 1963 R. C. DURBECK ETAL 3,078,022
FLUID BEARING
Filed Dec. 20, 1960 2 Sheets-Sheet 1

INVENTORS
ROBERT C. DURBECK
RAYMOND P. AUYANG
BY Geoffrey Knight
ATTORNEY

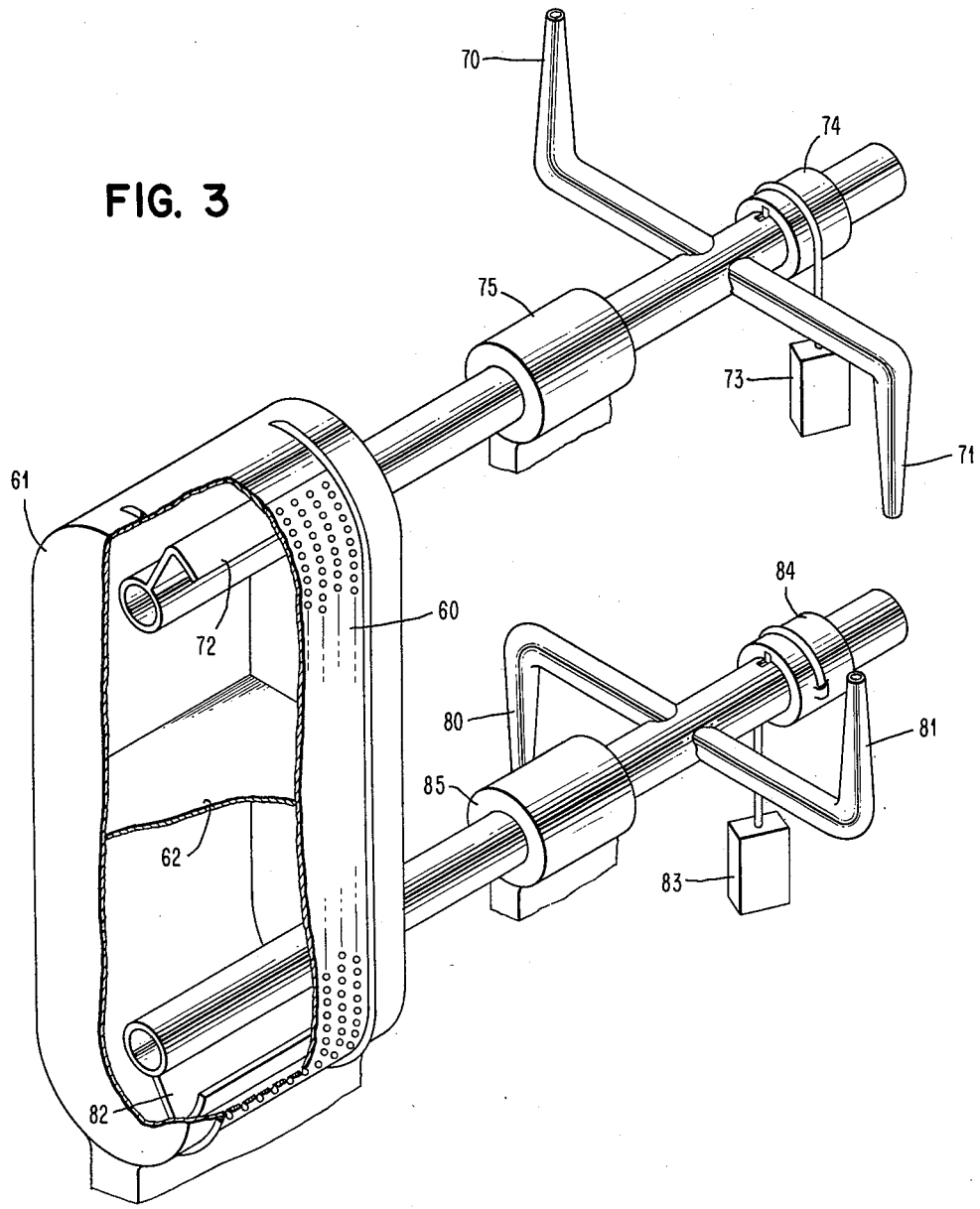

United States Patent Office 3,078,022
Patented Feb. 19, 1963

3,078,022
FLUID BEARING
Robert C. Durbeck and Raymond P. Auyang, Poughkeepsie, N.Y., assignors to International Business Machines Corporation, New York, N.Y., a corporation of New York
Filed Dec. 20, 1960, Ser. No. 77,046
9 Claims. (Cl. 226—97)

This invention relates to fluid devices and more particularly to fluid pressure support bearings.

It is well-known in the art that an object which is loading a fluid bearing is actually supported by a column or layer of pressurized fluid between the bearing and the load. This type of arrangement normally permits a limited amount of the fluid to escape, thereby requiring a pump that is able to supply a sufficient volume to enable it to maintain the pressure despite the limited escape of the fluid. However, situations exist where the use of a fluid bearing is desirable but where the location of the supported object along or about the bearing and/or the size of the supported area of that object are subject to variation. These variations might allow excessive amounts of the fluid to escape when the supported area of the object does not cover the entire pressurized area of the bearing, thereby requiring a pump of high capacity that is able to maintain an essentially constant pressure even though delivering a large amount of fluid.

Examples of usages of fluid bearings typically exist in the web-feeding field. For instance, when it is necessary to change the direction of travel of a web by some angle, the web is normally fed over a guide which provides a bearing surface to support the web as it is being turned. The angle at which the web approaches the guide, the angle at which it leaves the guide, or both of these angles may be subject to wide variations, thereby changing the location and/or size of the supported area of the web.

A special application of this situation appears in magnetic-tape data recording where it is desirable to protect the magnetizable surface of the tape from any abrasion to assure a long useful life for the tape and to avoid the accumulation of the wear products that result from such abrasion. Where the tape must be passed over a guide to change the direction of travel of the tape, the preferred method of reducing abrasion is to utilize a pneumatic guide bearing, wherein air is blown outwardly from the bearing creating a cushioning layer of pressurized air between the bearing and the tape, thus supporting the tape so that its magnetizable surface does not contact the bearing. When, for instance, a guide is located adjacent a reel of tape, the angle of wrap of the tape about the guide varies in accordance with the amount of tape remaining on the reel. The impediment to the use of a pneumatic guide bearing at this location is that previous bearings have had pressurized support areas fixed in size so that, as an example, when the angle of wrap of the tape about the bearing is less than the exposed pressurized area, the tape does not cover the entire area and an excessive amount of air escapes allowing the internal air pressure of the bearing to drop, which causes the tape to be so insufficiently supported that the tape may rub against the surface. Also, when the angle of wrap is greater than the exposed pressurized area, the tape tends to rub against the bearing at the extremities of the angle of wrap, due to the lack of supporting air pressure under those portions of the tape.

Accordingly, it is an object of this invention to provide means to adjust the exposed pressurized area of a fluid bearing to correspond to the position and size of the bearing area of the supported object.

It is another object of this invention to provide means to adjust the exposed pressurized area of a cylindrical fluid bearing to match the existing angle of wrap of web material about the bearing.

A further object of this invention is to provide means to vary the position of one edge of the exposed pressurized area of a fluid bearing to correspond to the position of that edge of the bearing area of the load.

Another object of this invention is to provide means to vary the positions of two or more nonadjacent edges of the exposed pressurized area of a fluid bearing to correspond to the positions of those edges of the bearing area of the load.

It is a still further object of this invention to provide means to vary the exposed pressurized area of a fluid bearing in response to changes in the internal fluid pressure of the bearing.

This invention consists of a fluid support member utilizing a permeable surface through which pressurized fluid may flow to provide a cushion between the member and the object to be supported thereby, and closure means to seal off varying portions of the permeable surface in response to a difference in the internal fluid pressure of the bearing from a predetermined value of that pressure.

In one embodiment of the invention, pressurized air is passed through a curved, perforated plate to support a web. The air pressure operates a torque motor which tends to rotate a cover plate to expose a greater area of the perforated plate against the action of a constant force device. The constant force device tends to rotate the cover plate so as to decrease the exposed area. Any excessive air loss due to the web not covering all of the perforated plate reduces the internal pressure of the air, so that the constant force device closes off a portion of the perforations and reduces the amount of air being lost. Other embodiments are introduced hereinafter.

The invention may be utilized to vary two or more nonadjacent sides of the permeable plate of a fluid bearing by duplication of the aforementioned system, wherein the individual systems are isolated from each other to avoid interaction.

An advantage of this invention is that it permits the use of an air bearing wherever the angle of wrap of a web about that bearing is subject to change without incurring the danger of damaging either the web or the bearing because of abrasion or wear products resulting from that abrasion.

A further advantage of this invention is that it allows the use of high tensions on webbing where the angle of wrap of the webbing about the air bearing is subject to change, without requiring unreasonably high air pressures to support the tape.

Another advantage of this invention is that, in magnetic-data recording where excessive wear will introduce errors, it allows the use of extremely high recorded data bit densities without critical limitations.

The foregoing and other objects, features and advantages of the invention will be apparent from the following more particular description of preferred embodiments of the invention, as illustrated in the accompanying drawings.

In the drawings:

FIG. 3 is a partially cut-away, perspective view of a second embodiment of the invention wherein two individual systems are utilized to vary two nonadjacent sides of a fluid bearing.

Figure 1:
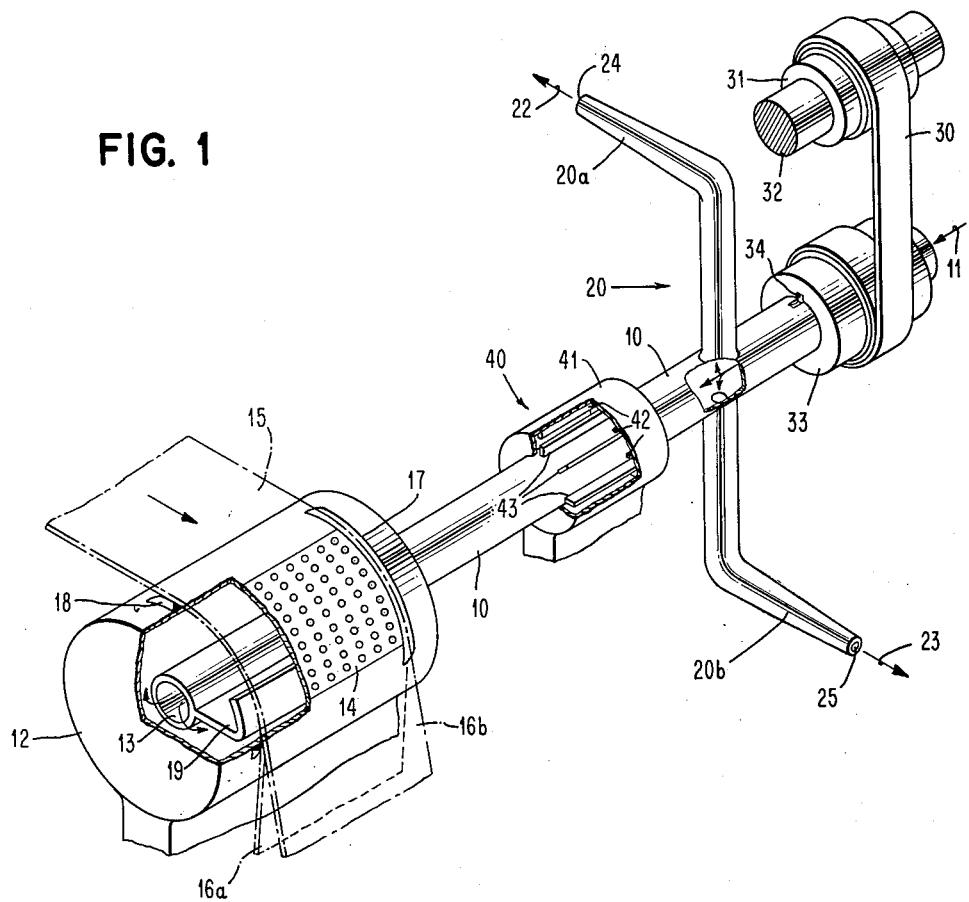
FIG. 1 is a perspective view of one embodiment of the device with parts cut away to disclose the features of the invention.

Referring to one specific embodiment of the invention shown in FIG. 1, the fluid bearing illustrated is in the form of a pneumatic guide bearing wherein pressurized air is blown into a hollow shaft 10 in the direction of arrow 11 and progresses through the length of the shaft to enter a stationary cylindrical bearing enclosure 12 as shown by arrows 13. The air is then blown through an outlet which may be covered by a permeable material, such as a perforated plate 14, a plate with a longitudinal slot, or a filter element made of a suitable porous material. This air supports web-like material 15 wrapped over the bearing adjacent the perforated plate. The web is restrained from lateral displacement by any convenient means, such as guides 17, 18. The shaft 10 is mounted so that it may rotate in either a clockwise or counterclockwise direction. A rotary plate 19, which is mounted on the shaft 10, acts as a valve to seal off varying portions of the perforated plate 14 to control the flow of air through the perforated plate, depending upon the rotational position of the shaft. In this manner, the rotary valve is able to change the effective bearing area afforded by the air passing the perforated plate and restrict this area to the portion of the plate not sealed off by the valve.

A reaction air motor 20, comprising tubes 20a and 20b connected to shaft 10 utilizes the difference between the pressure of the air internal to the bearing and the atmospheric pressure to develop a clockwise torque on the shaft 10. A portion of the air 11 that is blown into the shaft 10 is forced through the tubes 20a and 20b and escapes into the atmosphere as shown by the arrows 22, 23. This escaping air acts as a couple about the shaft 10 which generates a clockwise torque tending to open the valve 19, the amount of this torque being directly proportional to the pressure of the air escaping and upon the size of the apertures 24, 25.

A constant torque spring 30, of the type illustrated by Cook, U.S. Patent No. 2,647,743, issued August 4, 1953, is coiled at one end on a bushing 31 which is freely mounted for rotation on a shaft 32. The other end of spring 30 is coiled on a bushing 33 fixedly attached to the shaft 10 by, for instance, a key 34. Spring 30 is preset to exert a counterclockwise torque on shaft 10 of constant value independently of the degree of rotation clockwise or counterclockwise of the shaft. The value of this torque is dependent upon the amount of set given the spring 30 in its manufacture, and is chosen to balance the clockwise torque of the reaction air motor 20, at a certain normal air pressure. In this manner, when the internal pressure of the air bearing is at its normal value, the torque of the air motor is balanced by the spring and no motion is induced in the system.

Figure 2:
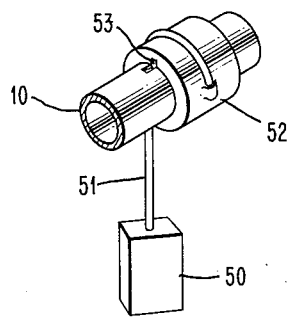
FIG. 2 is a perspective view of an alternative means for producing a constant torque in the embodiment of FIG. 1.

Illustrated in FIG. 2 is an alternative means for obtaining a constant counterclockwise torque about the shaft 10 which replaces the constant torque spring 30 (FIG. 1). The constant torque means shown in FIG. 2 consists of a weight 50 attached by a flexible strand 51 to a pulley 52, which pulley is fixedly attached to the shaft 10, for instance, by a key 53. Any suitable resilient forcing means may be used in place of the spring 30 or weight 50 to satisfy the design criteria of any specific application.

The bearing is situated so that as the web 15 approaches the bearing in the direction of the arrow in FIG. 1, it becomes tangential to the bearing surface only at the left edge of the perforated plate 14. However, the angle of approach of the web from the right (as at 16a or 16b) may be subject to variation, and the only restriction is that there be no possibility of the web becoming tangential to the cylinder 12 at any point to the right of or below the edge of the perforated plate.

Assuming, as an example, that the angle of wrap of the web about the bearing decreases, in other words, that the right-hand point of tangency of the web position 16a moves in a counterclockwise direction by random amount to position 16b the web does not cover the entire exposed area of the perforated plate 14, thereby allowing an amount of air to escape from the bearing over and above the amount which normally escapes. This causes the internal air pressure of the bearing to decrease, which decreases the torque generated by the air motor 20, allowing the torque of the spring 30 to predominate and to rotate the shaft 10 and the valve 19 in a counterclockwise direction to seal off the portion of the perforated plate 14 not covered by the web 15, thereby returning the internal air pressure of the bearing to its normal value and increasing the torque of the air motor so that it again balances the torque of the spring. In this manner, the exposed area of the perforated plate is decreased to correspond to the decrease in the angle of wrap of the web about the bearing.

If the angle of wrap of the web increases (16b to 16a), the web covers more than the exposed area of the perforated plate 14, thereby reducing the bearing air flow from the amount which normally escapes. This causes the internal air pressure of the bearing to increase, in turn increasing the torque of the air motor 20, so that it overcomes the torque of the spring 30 and rotates the valve 19 in a clockwise direction until the exposed area of the perforated plate again corresponds to the angle of wrap of the web around the bearing. Then the internal air pressure of the bearing returns to its normal value, decreasing the torque of the air motor so that it is again balanced by the torque of the spring.

A damping means, such as a viscous damper 40, is used to stabilize the system and reduce any tendency for the system to oscillate.

The viscous damper 40 comprises a stationary cylindrical casing 41 in which shaft 10 is disposed for rotation. Blades 42 fixed to the inner surface of casing 41 cooperate with blades 43 mounted on shaft 10. A viscous fluid in casing 41 resists any rotary movement of the shaft 10 by the frictional drag between the blades 42 and 43.

A fundamental factor in the operation of the device illustrated in FIG. 1 is the internal fluid pressure of the bearing. If the bearing is to be used to support a web that is subjected to a high tensional force, the pressure of the air supplied to the bearing must at least be sufficient to support the web away from the bearing surface. The constant torque spring must be preset to a higher torque to enable it to balance the increased torque of the air reaction motor at this higher pressure. Thus, the entire system must be calibrated in accordance with the desired air bearing pressure.

Under many circumstances it may be desirable to utilize a spring 30 that has a torque characteristic that is not constant, examples of which are shown in the aforementioned patent. For instance, if the tensional force exerted on the web varies as a function of the angle of a wrap of the web about the bearing, the internal fluid pressure of the bearing should vary in accordance with the tensional force, to assure that the web remains the same distance from the surface of the bearing regardless of the angle of wrap. Thus, since the internal fluid pressure of the bearing is dependent upon the torque exerted by the spring 30, that torque should also change in proportion to the tensional force. The desired torque characteristics may easily be produced by presetting the spring to those characteristics in accordance with the method taught in the aforementioned patent.

The air 11 blown into the control system may be essentially isolated from an overall pneumatic system by means of an impedance orifice, to assure that the pressure changes necessary for the operation of the control system do take place and to assure that no two control systems interact with each other. However, it should be noted that the pressure of the air or other fluid that supports the object is a constant when the object is floating on the fluid. Therefore, if the source pressure should increase by a large amount, tending to blow the tape off the bearing, the system will operate to open the valve 19, increasing the amount of air loss, which tends to maintain the pressure constant.

In any specific application of the device a set of limit stops (not shown) may be utilized to limit the extent of rotation of the shaft 10, should the valve rotate beyond the desired limits.

FIG. 3 illustrates a pneumatic guide bearing in which two systems of the type shown in FIG. 1 are utilized to vary two nonadjacent sides of a common outlet 60, which may be a permeable plate made of a suitable porous material. The two systems shown are placed within a common enclosure 61, but are isolated from each other by means of a partition 62. In this manner, the angles of approach of a web to the bearing at either the upper or lower edge of the porous plate may be subject to variations independently of each other.

In the upper system, a reaction air motor 70, 71 is adapted to generate a counterclockwise torque tending to rotate a valve 72 in a counterclockwise direction, opening the valve. This torque is balanced by a constant torque caused by a weight 73 attached to a pulley 74, and the system is stabilized by a damper 75. The lower system utilizes a reaction air motor 80, 81 adapted to create a torque in the clockwise direction tending to open a valve 82, which torque is balanced by a weight 83 acting on a pulley 84. The system is stabilized by a damper 85. Each of these systems operates in essentially the same manner as the system illustrated in FIG. 1; the only difference is the direction of rotation of the upper system in opening and closing the rotary valve 72.

It will be appreciated that all the rotational movements and annular shapes illustrated may be easily linearized by one skilled in the art without departing from the spirit and scope of the invention.

While the invention has been particularly shown and described with reference to preferred embodiments thereof, it will be understood by those skilled in the art that various changes in form and details may be made therein without departing from the spirit and scope of the invention.

We claim:

1. In a fluid bearing of the type wherein an object is supported adjacent to a support member by a firm of translating fluid passed through a permeable portion of said support member, said portion being of an area at least as great as the area of surface of said object in proximity with said support member, a device for controlling the area of said permeable portion, comprising:

closure means for blocking off part of said permeable portion;

and operating means for controlling the position of said closure means including resilient force means tending to cause said operating means to move said closure means in one direction so as to change the operative area of said permeable portion, and pressure responsive means operable in response to changes in the pressure of fluid supplied to said permeable portion to cause said operating means to move said closure means in a second direction so as to oppose the change in operative area of said permeable portion caused by said resilient force means.

2. In a fluid bearing of the type wherein an object is supported adjacent to a support member and a pressurized fluid is allowed to escape from said support member by passing through a permeable portion thereof, which portion is proximate to the object being supported, the fluid in passing between the permeable portion and said object exerting a force which supports said object, a device for controlling the area of said portion, comprising:

closure means for blocking off part of said permeable portion;

and operating means for controlling the position of said closure means including resilient force means tending to cause said operating means to move said closure means so as to reduce the operative area of said permeable portion, and pressure responsive means operable in response to an increase in the pressure of fluid supplied to said permeable portion to cause said operating means to move said closure means so as to increase the operative area of said permeable portion.

3. A fluid support device comprising:

a source of pressurized fluid including a permeable surface through which fluid may escape;

an object disposed in proximity with said surface in a manner so as to be maintained out of contact therewith by the force of fluid escaping through said permeable portion;

closure means for blocking off part of said permeable portion;

and operating means for controlling the position of said closure means including resilient force means tending to cause said operating means to move said closure means so as to reduce the operative area of said permeable portion, and pressure responsive means operable in response to an increase in the pressure of fluid supplied to said permeable portion to cause said operating means to move said closure means so as to increase the operative area of said permeable portion.

4. A bearing device of the type having a support member about which an object may be supported against the action of forces in the environment of the object, comprising:

support means for directing pressurized fluid against said object in a manner so that the force of said fluid supports said object;

control means operative to control the amount of fluid directed against said object;

resilient means for causing said control means to reduce the amount of fluid directed against said object;

and pressure means incrementally operated in response to increasing increments in the pressure of the fluid within said support means to oppose the operation of said resiliently forced means by corresponding amounts, whereby the amount of fluid directed against said object is controlled by the pressure of fluid in said support member.

5. A fluid support device comprising:

a source of pressurized fluid including a permeable surface through which fluid may escape;

an object disposed in proximity with said surface in a manner so as to be maintained out of contact therewith by the force of fluid escaping through said permeable portion;

a plurality of closure means, each operable to block off a corresponding different part of said permeable portion;

and a plurality of operating means each operable to control the position of a respectively corresponding one of said closure means, each including resilient force means tending to move the related closure means so as to reduce the operative area of said permeable portion, and each including pressure responsive means operable in response to an increase in pressure in said source to move the related closure means so as to increase the operative area of said permeable portion.

6. In a pressurized fluid bearing having an outlet through which a pressurized fluid is directed to support an element away from said bearing, wherein area of said element in common with said outlet may vary;

a device to ensure the support of said element away from said bearing, comprising:

valve means for sealing off various portions of said outlet;

means tending to close said valve means;

and means sensitive to the fluid pressure at said outlet acting in opposition to said closing means to maintain the pressure within said bearing at a predetermined value.

7. A device to which a fluid under pressure is supplied to ensure the support of an element away from said device wherein the area of supported surface of said element may be subject to variation, comprising:

means having an outlet for directing said fluid against said surface;

means tending to close off varying portions of said outlet to restrict the flow of said directed fluid;

and means sensitive to and utilizing the back pressure of said directed fluid to act in opposition to said closing means to maintain the back pressure of said directed fluid at a predetermined value.

8. A device to which a fluid under pressure is supplied to provide a fluid film between a support member and an element support by said member, wherein the common area between said support member and said element may be subject to variation, characterized by the fact that there is included:

a permeable portion on said support member, said permeable portion having an area as large as the maximum of said common area and through which said pressurized fluid may flow;

restricting means tending to decrease the area of said permeable portion;

and means sensitive to the pressure of said fluid at said permeable portion acting in opposition to said restricting means in proportion to said fluid pressure relative to a predetermined value.

9. A fluid device, comprising:

a source of pressurized fluid including a permeable surface of determinable area through which fluid may escape;

an object disposed in proximity with said permeable surface so as to be maintained spaced therefrom by the force of said fluid escaping through said permeable surface, the area of coverage by said object of said permeable surface being subject to variations; and closure means responsive to pressure variations caused by the varying coverage of said permeable surface by said object for variably covering the area of said permeable surface of said source.

References Cited in the file of this patent

UNITED STATES PATENTS

| | | |
|---|---|---|
| 2,786,673 | Bridenstine | Mar. 26, 1957 |
| 2,954,911 | Baumeister et al. | Oct. 4, 1960 |